R. G. TAYLOR.
RAILWAY TRUCK.
APPLICATION FILED MAR. 6, 1917.

1,243,006.

Patented Oct. 16, 1917.

Inventor:
Ralph G. Taylor

UNITED STATES PATENT OFFICE.

RALPH G. TAYLOR, OF CHICAGO, ILLINOIS, ASSIGNOR TO UNIVERSAL DRAFT GEAR ATTACHMENT CO., OF CHICAGO, ILLINOIS, A CORPORATION OF ILLINOIS.

RAILWAY-TRUCK.

1,243,006.  Specification of Letters Patent.  Patented Oct. 16, 1917.

Application filed March 6, 1917. Serial No. 152,730.

*To all whom it may concern:*

Be it known that I, RALPH G. TAYLOR, a citizen of the United States, and resident of Chicago, county of Cook, and State of Illinois, have invented certain new and useful Improvements in Railway-Trucks, of which the following is a specification, and which are illustrated in the accompanying drawings, forming a part thereof.

The invention relates to trucks for railway cars, and is particularly applicable to freight car service.

The object of the invention is to provide supplemental springs between the truck bolster and frame, and consists broadly in a chambered bolster with springs housed therein and arranged to supplement the usual springs upon which the bolster rests. More specifically, it consists in a structure such as is hereinafter described, which, however, may be varied in detail, as illustrated in the accompanying drawings, in which—

Figure 1:
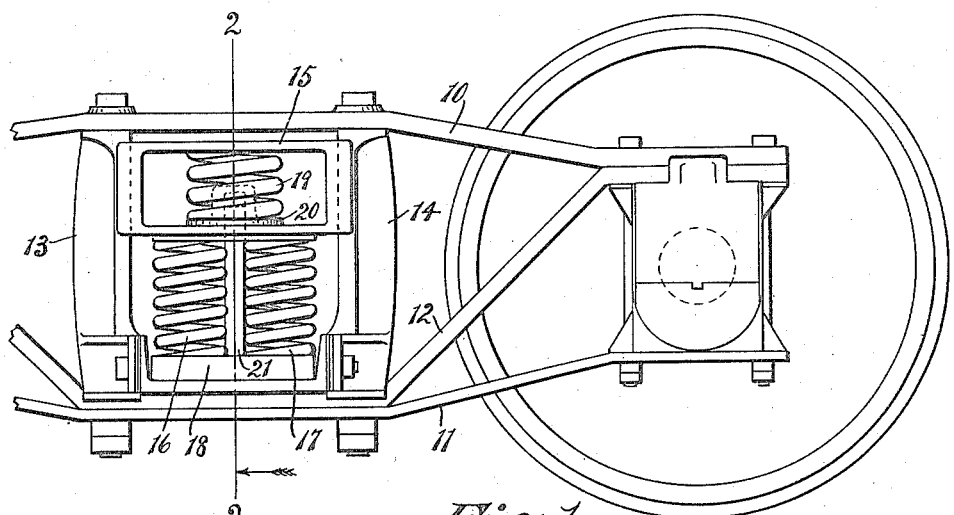
Figure 1 is a detail side elevation of a truck embodying the invention.

The invention may be incorporated into trucks of various forms of construction, there being shown a simple and common form of truck provided with a side frame comprising top and bottom bars 10, 11, and an intermediate bar 12, and a pair of pedestals 13, 14. The bolster 15 is inclosed between the upper and intermediate frame members and the pedestals, and is in vertical sliding engagement with the latter, being supported on the usual springs, as 16, 17, generally four in number, which rest upon a spring seat 18.

The bolster 15 is of the box type and within it is housed a helical spring 19, having a vertical axis and resting upon a seat 20, between which and the top of the bolster it reacts, the seat plate 20 being recessed in its lower face. A stout pin 21 fits within the recess in the plate 20, and projects downwardly through an aperture in the bottom of the bolster, the parts being so positioned that this pin is located between the truck springs 16, 17. Preferably the length of the pin is less than the normal distance between the bottom of the seat recess and the element of the frame with which it coöperates.

Figure 2:
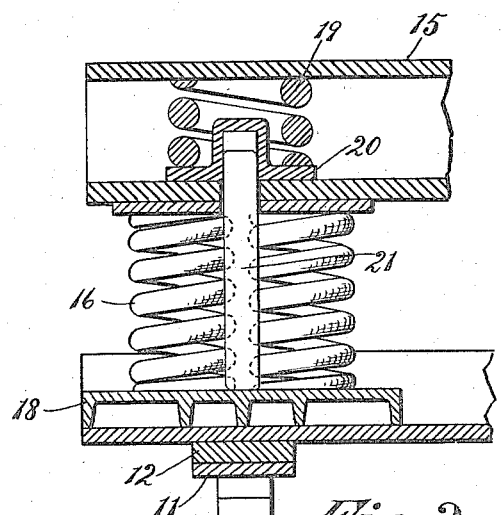
Fig. 2 is a sectional view on the line 2—2 of Fig. 1.
Figure 4:
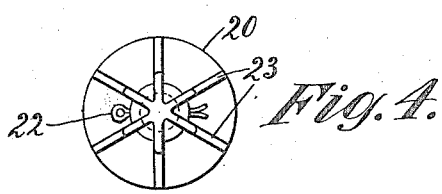
Fig. 4 is a detail of the spring seat housed within the bolster.

In the construction illustrated in Fig. 2, lost motion is provided between the pin 21 and the spring seat 20, the pin resting at all times on the bottom spring seat 18 and slidingly entering the recess in the plate 20. Upon compression of the springs 16, 17, the upper end of the pin 21 engages the bottom of the recess in the plate 20, and thus brings the spring 19 into action.

Figure 3:
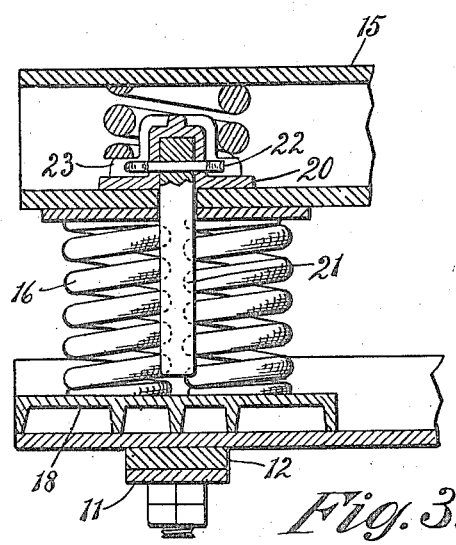
Fig. 3 is a similar view showing a slight modification.

In the construction of Fig. 3, the pin 21 is shown as secured within the recess of the plate 20 by means of a key 22, and for convenience of assembly the upper face of the plate is provided with a plurality of radial ribs 23, upon which the spring 19 seats and between which the key 22 may be easily inserted. The length of the pin 21 is preferably such that under normal loads its lower end will be out of contact with the seat upon which the springs 16, 17, rest. Under excessive loads this pin will come into engagement with the spring seat 18, whereupon the spring 19 will be called into action.

It is the usual practice to provide truck springs of a suitable capacity for sustaining the load the car is designed to carry. It not infrequently occurs that cars are loaded beyond their intended capacity. For example, cars ordinarily intended for coal service are sometimes used for carrying heavier freight, such as ore. In that case, if the car is fully loaded its springs may be fully compressed and consequently become mere solid blocks. Where the expedient is resorted to of putting in extra heavy truck springs to take care of excessive load, they are too rigid to have any material cushioning action under the lighter lading, thus resulting in destructive jarring of the car and increasing the tendency of the car to jump from the track.

The present invention adapts the car to both light and heavy service, with efficient spring supports in either case. The successive action of the main springs and the supplemental springs is secured by the provision of lost motion between the pin 21 and one of the plates with which it comes into endwise engagement. Should it be desired to have the bolster springs in constant service, it is necessary only to eliminate this lost motion by a lengthening of the pin.

I claim as my invention—

1. In a car truck, in combination, a suitable frame, a bolster, a spring support for the bolster carried by the frame, and a cushioning element carried by the bolster and responsive to the weight of the load for supplementing the spring support.

2. In a car truck, in combination, a suitable frame, a bolster, a spring support for the bolster carried by the frame, a cushioning element carried by the bolster for supplementing the spring support and being effective upon a partial compression of such support.

3. In a car truck, in combination, a suitable frame, a chambered bolster, a spring within the bolster, and a thrust member interposed between the spring and the frame.

4. In a car truck, in combination, a suitable frame, a chambered bolster, spring supports for the bolster carried by the frame, a spring housed within the bolster and reacting against the top thereof, a thrust pin interposed between the housed spring and the frame and normally out of engagement with one of such elements.

5. In a car truck, in combination, a suitable frame, a chambered bolster, springs supporting the bolster on the frame, a spring within the bolster and reacting between a fixed upper abutment and a movable lower abutment, and a thrust member interposed between the movable abutment and the frame.

6. In a car truck, in combination, a suitable frame, a chambered bolster, springs carried by the frame and supporting the bolster, a spring within the bolster and reacting against the top thereof, a seat for the last-named spring having a recess in its lower face, a thrust pin entering the seat recess and engaging the frame.

7. In a car truck, in combination, a suitable frame, a chambered bolster, springs carried by the frame and supporting the bolster, a spring within the bolster and reacting against the top thereof, a seat for the last-named spring, such seat having a recess in its rearward face, a pin interposed between the spring seat and an element of the frame, the length of the pin being less than the normal distance between the bottom of the recess and the part of the frame with which the pin makes contact.

8. In a car truck, in combination, a suitable frame, a chambered bolster, springs carried by the frame and supporting the bolster, a spring within the bolster and reacting against the top thereof, a seat for the last-named spring having a recess in its lower face, a thrust pin entering the seat recess and engaging the frame, and means for securing the pin within the recess.

9. In a car truck, in combination, a suitable frame, a chambered bolster, springs carried by the frame and supporting the bolster, a spring within the bolster and reacting against the top thereof, a seat for the last-named spring having a recess in its lower face, a thrust pin entering the seat recess and engaging the frame, and means for securing the pin within the recess, the lower end of the pin being normally out of engagement with the frame.

10. In a car truck, in combination, a suitable frame, a chambered bolster, springs carried by the frame and supporting the bolster, a spring within the bolster and reacting against the top thereof, a seat for the last-named spring having a recess in its lower face, a thrust pin entering the seat recess and engaging the frame, and a pin extending through the first-named pin and the recessed spring seat.

RALPH G. TAYLOR.